(12) United States Patent
Johnson et al.

(10) Patent No.: US 6,727,864 B1
(45) Date of Patent: Apr. 27, 2004

(54) METHOD AND APPARATUS FOR AN OPTICAL FUNCTION GENERATOR FOR SEAMLESS TILED DISPLAYS

(75) Inventors: Michael Johnson, Phoenix, AZ (US); Chung-Jen Chen, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 569 days.

(21) Appl. No.: 09/615,498

(22) Filed: Jul. 13, 2000

(51) Int. Cl.⁷ .................................................. G09G 5/00
(52) U.S. Cl. ..................... 345/1; 345/903; 348/744; 348/745; 348/751
(58) Field of Search .................... 345/1, 87, 903, 345/103; 348/383, 744, 778, 785, 751, 745, 746, 747; 349/5, 6, 7, 8, 9, 10

(56) References Cited

U.S. PATENT DOCUMENTS

| | | | |
|---|---|---|---|
| 3,833,764 A | 9/1974 | Taylor | 178/7.5 D |
| 4,103,435 A | 8/1978 | Herndon | 35/12 N |
| 4,974,073 A | 11/1990 | Inova | 358/87 |
| 5,543,870 A | 8/1996 | Blanchard | 353/74 |
| 5,626,410 A | 5/1997 | Chambers et al. | 353/94 |
| 5,764,209 A * | 6/1998 | Hawthorne et al. | 345/87 |
| 6,017,123 A * | 1/2000 | Bleha et al. | 353/30 |
| 6,292,157 B1 * | 9/2001 | Greene et al. | 345/1.3 |

FOREIGN PATENT DOCUMENTS

| | | |
|---|---|---|
| EP | 0786687 A | 7/1997 |
| WO | WO 9917851 A | 4/1999 |
| WO | WO 0018139 A * | 3/2000 |

OTHER PUBLICATIONS

Patent Abstracts of Japan, [JP 03 054540A (Seiko Epson Corp.), Mar. 8, 1991], vol. 015, No. 205 (P–1206), May 27, 1991. abstract.

* cited by examiner

*Primary Examiner*—Dennis-Doon Chow

(57) ABSTRACT

Producing seamless tiled images from multiple displays includes measuring a luminance profile of each of the displays, computing a desired luminance profile for each of the displays, and determining a spatial gradient profile of each of the displays based on the measured luminance profile and the computed desired luminance profile. The determined spatial gradient profile is applied to a spatial filter to be inserted into each of the displays to produce the seamless tiled display image.

72 Claims, 12 Drawing Sheets

(X,Y) POSITIONS ON THE DISPLAY SCREEN

METHOD AND APPARATUS FOR AN OPTICAL FUNCTION GENERATOR FOR SEAMLESS TILED DISPLAYS

The invention described herein was made in the performance of work under NASA Contract NAS1-20219, and I subject to the provisions of Section 305 of the National Aeronautics and Space Act of 1958 (42 U.S.C. 2457).

This invention relates generally to the field of optical displays, and more particularly pertains to tiled displays used to produce large, and/or high resolution images.

BACKGROUND

Multiple projection displays have been proposed and used for many years. In the 1950's, the "CINERAMA" system was developed for the film industry. The CINERAMA system used three films to project three images using three separate projectors, which were then combined to form a single panoramic image. Disneyland continues to use a similar multiple projector system, wherein a circle of projectors, shine onto a screen that circles the wall of a round room.

In the video field, multiple projector systems have been proposed and used for a number of specialty applications. U.S. Pat. No. 4,103,435 to Herndon and U.S. Pat. No. 3,833,764 to Taylor suggest using multiple projector systems for flight simulators. In many of these systems, multiple video screens are placed next to each other to form a large image display. A difficulty with many of the video based multiple projector display systems is that the multiple images often do not appear as one single continuous image on the display screen.

When multiple images are projected side-by-side on a single screen, there is normally a seam or overlapping region between the images (for example in an M×N projector array, where M and N are generally expressed as positive integer values, though, in using of overlap and portions of displays, fractional values may be assigned. Also M×N projector arrays can be arranged to have constant and identical overlap or can be arranged to have varying degrees of overlap, depending on one's optimization criteria, which can include reliability, fault tolerance, cost and performance). The final display image will either appear as multiple images placed side-by-side with a gap between images or, if the images are made to overlap on a single screen, with a bright line or band there between. In the region of overlap the light from each projector will add to the output light of the other(s). This applies to the black output level as well. Ideally, when displaying a black image, this region of overlap should be generally uniformly black across the entire displayed image. Instead one generally observes the black image to brighten in the regions of overlap. When the images of two projectors overlap, the amount of light in the overlapped regions of the images is approximately double the amount of light observed on the screen in regions where only a single projector image resides (in regions where four projected images overlap, the amount of light is approximately four times that of the single projector image, and so on). Thus, the observer of the screen will generally see the output image containing objectionable artifacts. The same effects happen for white images, and for all images in between black and white. Generally, the black and the white images may be conceptualized as the upper and lower reference levels for constructing any image whose content spans these two extremes.

The prior art (for example, in the Panoram tiled display) resolved overlap issues by requiring the display device to have a black reference level having very low stray light. This needed the use of CRT's, because CRT's have huge native contrast ratios and deep black, several times darker than other common display media such as LCD projectors, and DMD projectors. While the deep-dark display or CRT-only architecture might work well for many applications, it fails to meet requirements found in the cinematic, the medical and other industries demanding high image quality and performance. In these high performance applications, the contrast ratio requirements often exceed 1000:1. The cinema industry generally requires 1500:1, and the medical industry generally requires displays for digital radiography having contrast ratios in the range of about 2000:1 to 4000:1. With the contrast ratio of CRT's at that or a lesser range, any overlapping strategy as used in the CRT-only architecture fails. It divides the contrast ratio by the number of CRT's used. Thus, for a cinematic application requiring a contrast ratio of 1500:1, any overlap of the CRT's will shrink the contrast ratio to 750:1 in the region of overlap. Any regions having four CRT's overlapping will show a quadrupling in brightness and thus a reduction in contrast ratio to a mere 375:1. This is observable and generally objectionable in the industry.

Attempts have been made to hide such artifacts, one such example being raising the regions of non-overlap to the same brightness levels as the regions of overlap. Such practices are usually implemented by adjusting the input video level to obliterate the visibility of the regions of overlap. However, this method reduces the contrast ratio over the entire display, even in areas where only a single projector projects its image content. And in cases where multiple CRT's or other imaging devices overlap their imagery, the contrast ratio over the entire display will be compromised accordingly.

What is desired is a fall-off in intensity of black and white levels such that the superposed images produce a uniform luminance from center to edges, including the overlapped regions of the projected image. In practice, such an ideal luminance profile is difficult to achieve, as the displays generally exhibit a fall-off in intensity from the center of displayed image to its edges. To attain a uniform, center to edge luminance profile requires clipping the display's native intensity at display center and elsewhere to the same value as at the edges. Unfortunately, this will result in the loss of the displays native brightness and will significantly reduce the power to image brightness conversion efficiency of the system. Another method based on insensitivity of human vision to low spatial frequency changes is to allow a fall-off of the luminance profile near the edges of the tiled image. In theory, such profiles can be achieved electronically by adjusting the video going into each display. The corrective functions can be multiplied by the image content and will result in a uniform output over much of the gray scales to be rendered. However, the closer the input image approaches the black state, the more the actual deviates from the ideal using this method. This is because the input video commanding a black state on the display does not achieve a true black state in practice. This, as was explained above, is because display technologies generally pass or emit light even when displaying black.

Therefore there is a need for a seamless tiled projection system that does not produce any artifacts in the overlapping region, and is easier to incorporate into a commercial projector system, and yet provides a seamless tiled display image over a wider viewing angle than that of the prior art.

SUMMARY OF THE INVENTION

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

According to one aspect of the present invention, a method of producing a seamless tiled display image from multiple overlapping discrete images produced by multiple displays includes measuring a luminance profile of each of the displays used in producing a seamless display image. The method then computes a desired luminance profile for each of the displays producing the seamless tiled display image. It determines a spatial gradient profile of each of the displays based on the measured luminance profile and the computed desired luminance profile of each of the displays. Then the method applies the determined spatial gradient profile to a spatial filter to be applied to each of the displays, and disposes the spatial filter with the spatial gradient profile anywhere in an image formation path of each of the displays to produce a seamless tiled display image from the overlapping discrete images produced by the displays.

Other aspects of the invention will be apparent on reading the following detailed description of the invention and viewing the drawings that form a part thereof.

DETAILED DESCRIPTION

Figure 1:
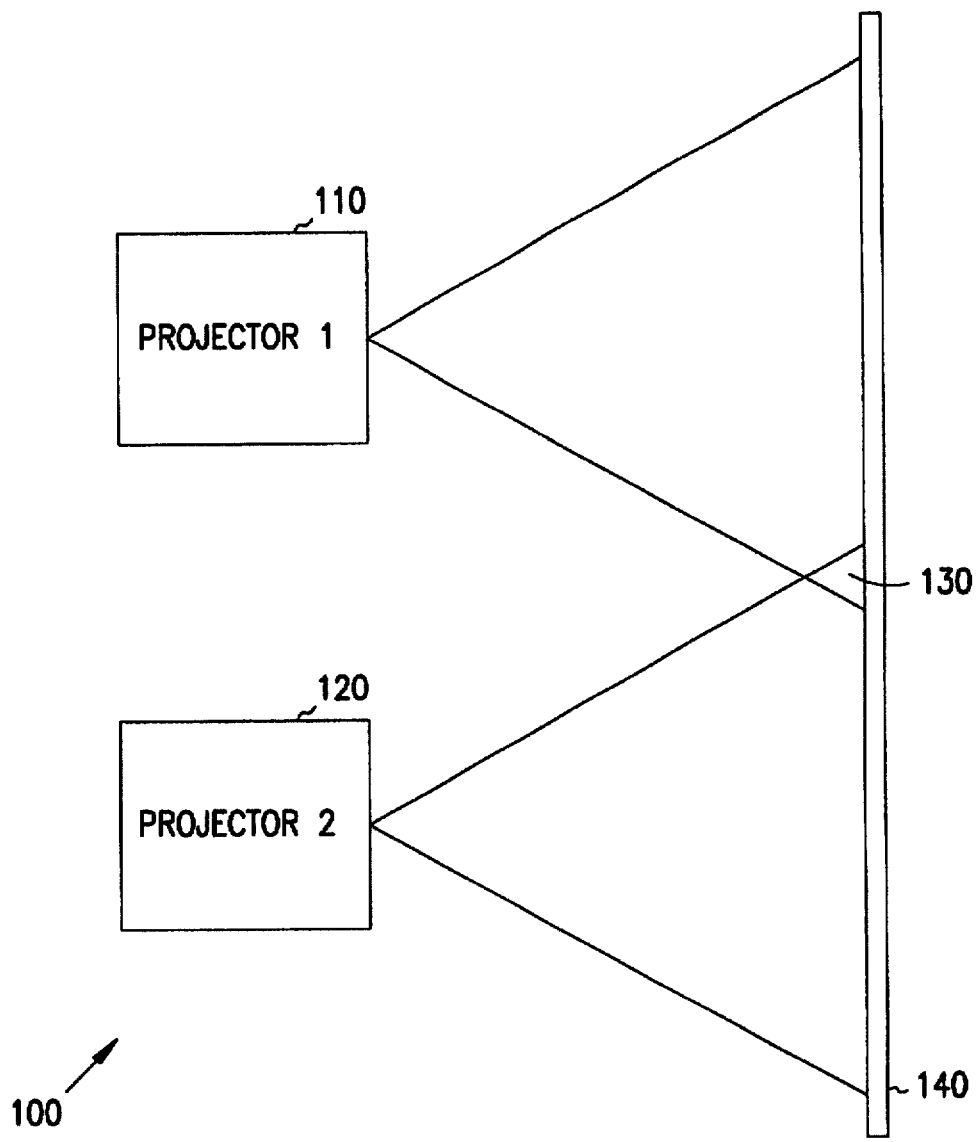
FIG. 1 is a schematic diagram showing a one by two array of images and their region of overlap.

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the spirit and scope of the present invention. The following detailed description is, therefore, not to be taken in a limiting sense, and the scope of the present invention is defined by the appended claims and their equivalents. In the drawings, like numerals describe substantially similar components throughout the several views. Like numerals having different letter suffixes represent different instances of substantially similar components.

In this document the term spatial profile refers to a function having a transmissivity which varies as a function of (x, y) position across a plane of a filter. The term spatial filter refers to a neutral density or monochrome filter having a transmissivity which varies as a function of (x, y) position across the plane of a filter. Iso-luminance images refers to images having a constant luminance as a function of (x,y) position. Luminance refers to amount of light energy measured on a surface of a display screen.

This document describes, among other things, an optical spatial gradient filter that is easier to incorporate into a commercial projector system, and yet provides a seamless tiled display image over a wider viewing angle than that of the prior art.

FIG. 1 is a schematic diagram, illustrating generally, by way of example, but not by way of limitation, one embodiment 100 of one-by-two array of projectors 110 and 120 projecting images on to a display screen 140. Projectors 110 and 120 are arranged in a one-by-two array to project images on to the display screen 140, such that the images overlap in a region 130 (where the outputs of the two projectors superpose) on the display screen 140. In the region of overlap 130 the light from projector 110 adds to the light from projector 120. Generally in this region of overlap 130 in a one-by-two array of projectors 110 and 120, the amount of light will be double the amount of light observed elsewhere on the display screen 140. Thus, an observer of the display screen will generally see an objectionable artifact on the display screen 140. Projectors 110 and 120 can be front or rear projectors. The display screen 140 can be front or rear screen type. In general, one skilled in the art can extrapolate the overlapping shown in FIG. 1 to an arbitrary number of projectors along either axis. Further, the axes can be arranged in a variety of ways such as horizontally, vertically, orthogonally diagonal, hexagonally, quad color arrangement, non-orthogonally, non-uniformly, and adaptively overlapping.

One can construct an M×N array of projectors, where M and N are generally expressed as positive integer values, though, in using of overlap and portions of displays, fractional values may be assigned. Also the M×N array of projectors can be arranged to have constant and identical overlapping images or can be arranged to have varying degrees of overlapping images, depending on criteria such as reliability, fault tolerance, cost and performance.

Figure 2:
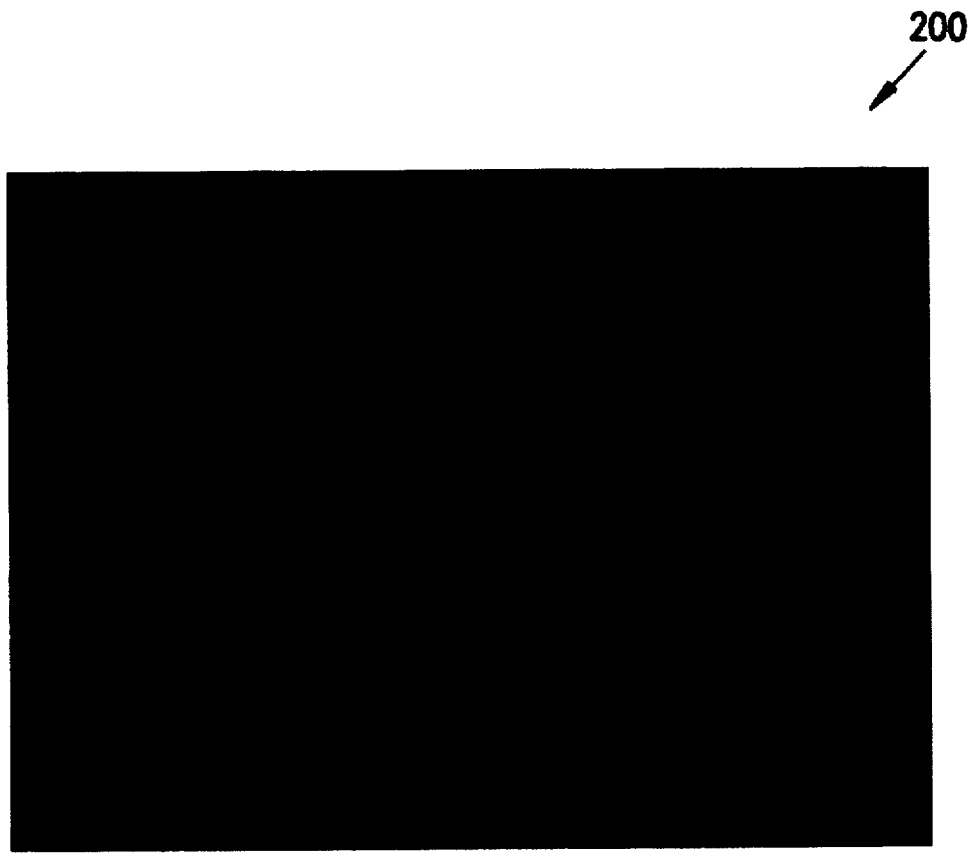
FIG. 2 illustrates a desired ideal black image state of overlapping images.

FIG. 2 illustrates generally, by way of example, a desired ideal black image state in an overlapping tiled display image 200. The displayed array of black image formed by a two-by-two array of projects 200 does not have any artifacts in the overlapping regions.

Figure 3:
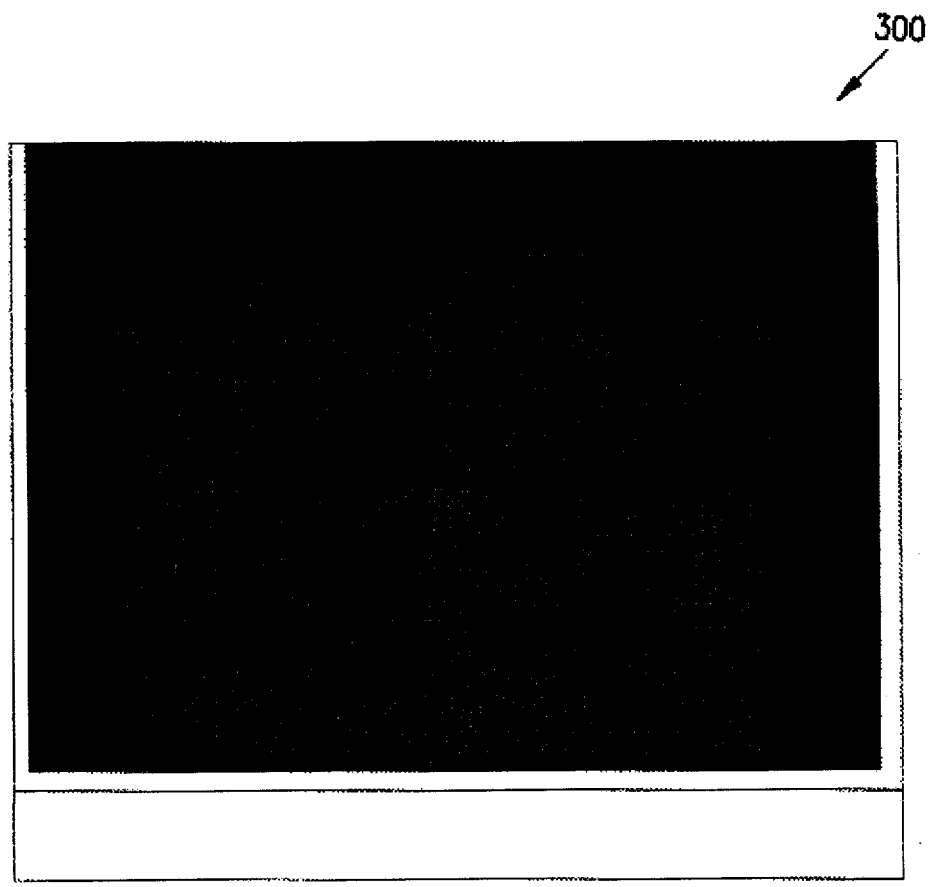
FIG. 3 illustrates a representative black image resulting from overlapping two by two array of images in the prior art.

FIG. 3 illustrates a representative black image including objectionable artifacts displayed by two-by-two array of projectors 300. FIG. 3 shows what one generally observes when using an array of conventional displays. The black image state brightens in the regions of overlap. In regions where two images overlap, the amount of light is two times the light elsewhere in the displayed image. In regions where four images overlap, the amount of light in the overlapping region is four times the light outside the overlapping region. Thus, the observer of the screen generally sees objectionable artifacts on the display screen.

Figure 4:
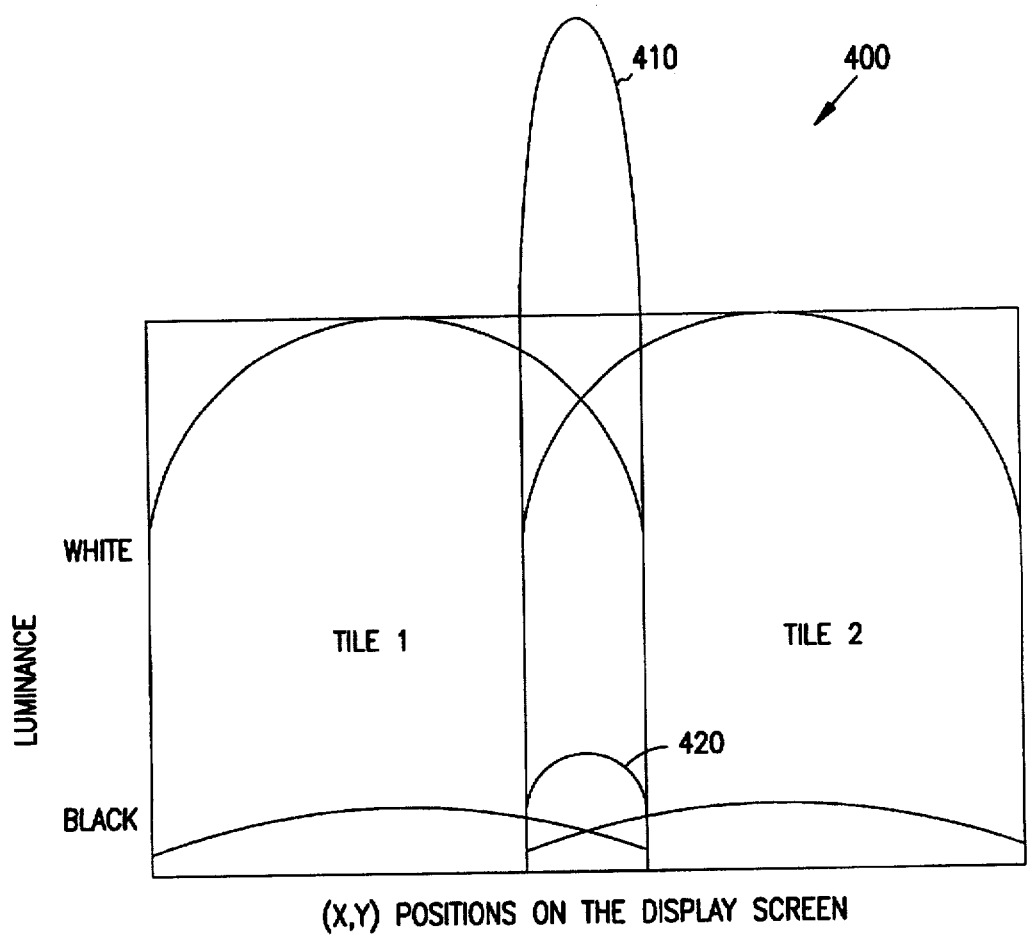
FIG. 4 illustrates white and black states of two projectors when tiled together according to conventional techniques.
Figure 5:
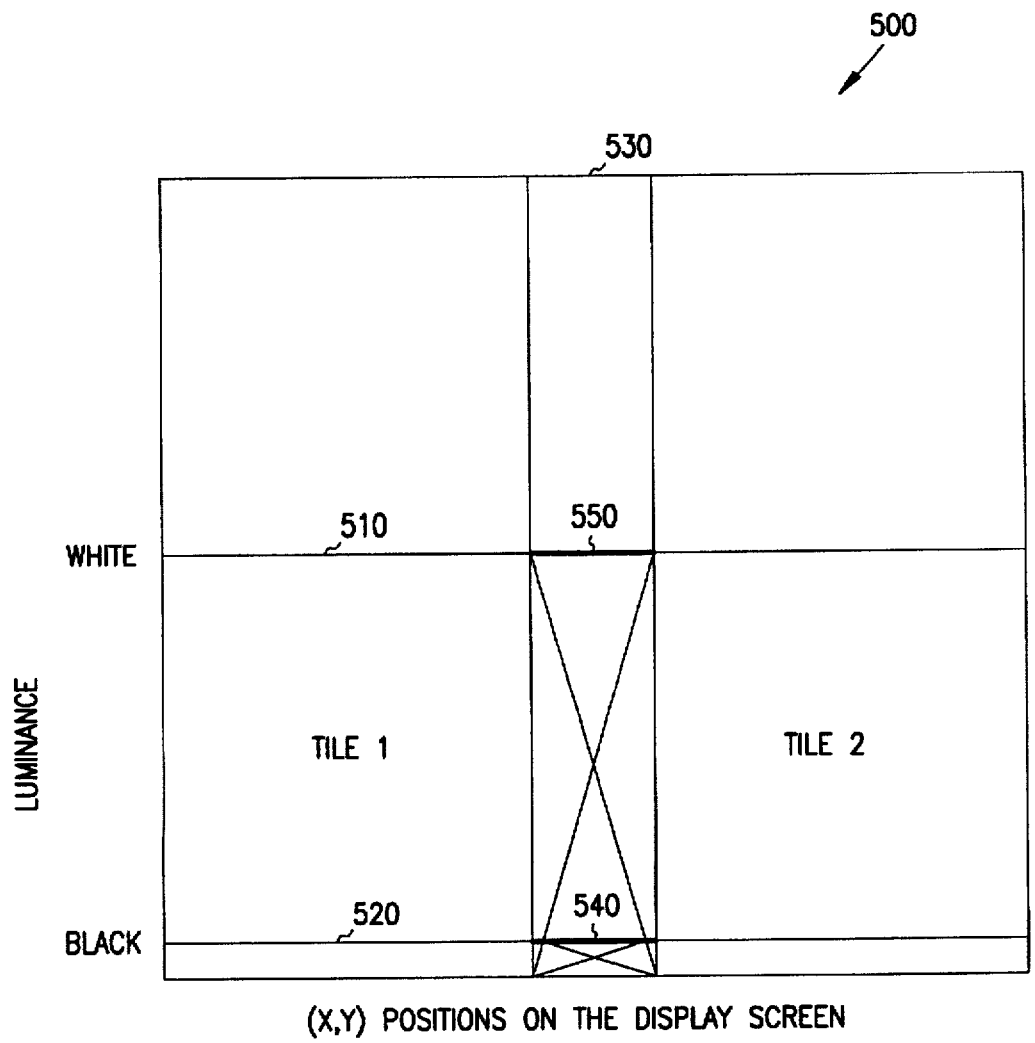
FIG. 5 illustrates desired idealized luminance profile when two images overlap.

FIG. 4 illustrates in a graph 400 the black and white states of two conventional projectors 110 and 120 when tiled together. The black image state, brightens in the regions of overlap, and in the region where two images overlap, the amount of light is two times the light elsewhere in the displayed image 420. Generally the same effects happen for a white image 410, and for all values in between black and white. Black and white images can be conceptualized as the upper and lower reference levels for constructing any image whose content spans these two extremes. Further, in recognition of the fact that if we resolve the issues for one reference level, black for example, then we resolve the problem for the white and for all other imagery in between. FIG. 5 is a graph 500 of a desired idealized luminance profile when two images overlap in an overlapping region 530. FIG. 5 also shows an ideal output of white and black levels 510 and 520 from projectors 110 and 120. The fall-off in intensity for white and black levels is such that the superposed result would add up to equal flat lines 540 and 550 spanning the region of overlap 530, to achieve the desired uniformity across the two tiled partially overlapping images.

Figure 6:
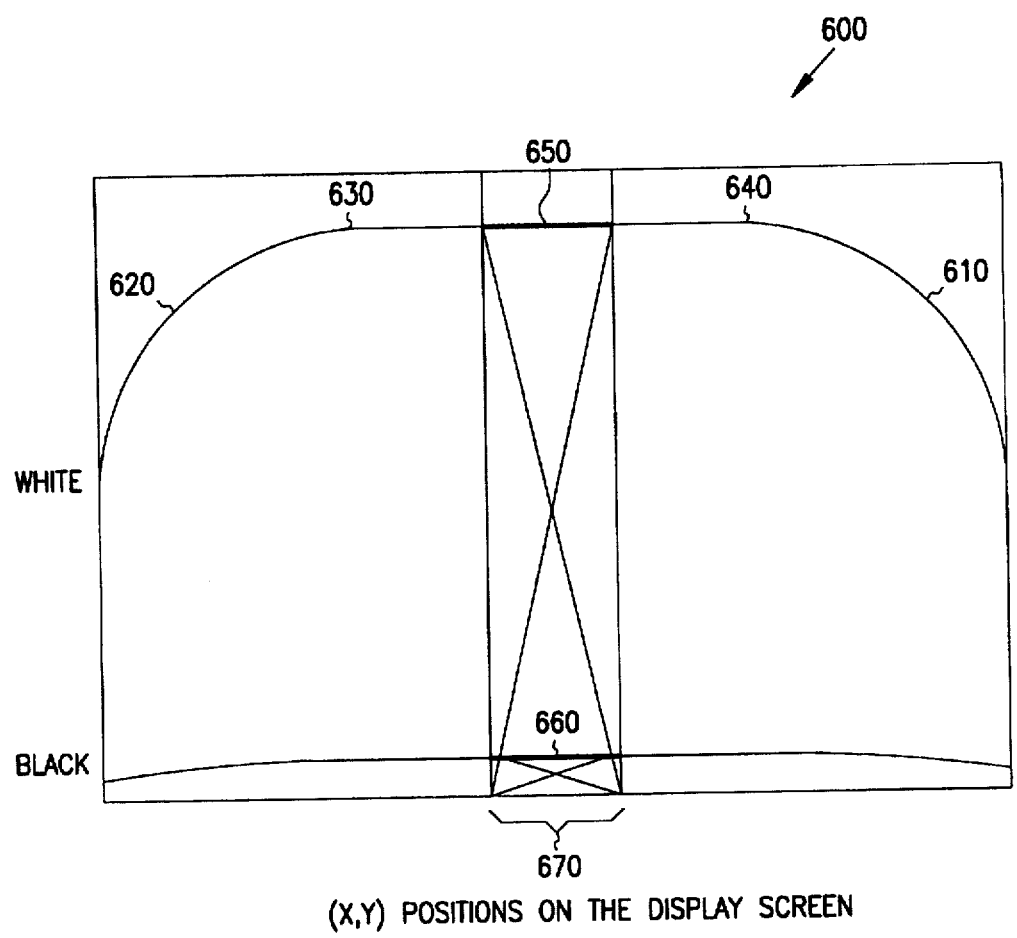
FIG. 6 illustrates a general roll-off of the luminance profile near the edges of two tiled overlapping images according to the invention.

FIG. 6 illustrates graphically at 600 one embodiment of a luminance profile that rolls off near the edges 610 and 620 of the two tiled overlapping images. Adjusting the profiles 610 and 620 shown in FIG. 6 to have the ideal combined luminance profiles 510 and 520 shown in FIG. 5 requires clipping the display's native intensity at display centers 630 and 640, which generally results in loss of the displays native brightness, and can significantly reduce the power to image brightness conversion efficiency of the display system. Allowing the roll-off of the tiled images near the edges 610 and 620, and superposing the two tiled images to add up to flat lines 650 and 660 in the region of overlap 670 enables the system to utilize the peak brightness capability of each tiled display and thus resulting in a brighter image, to achieve a higher power to image brightness conversion efficiency of the display system, and to eliminate undesirable artifacts in the overlapping region 670.

Figure 7:
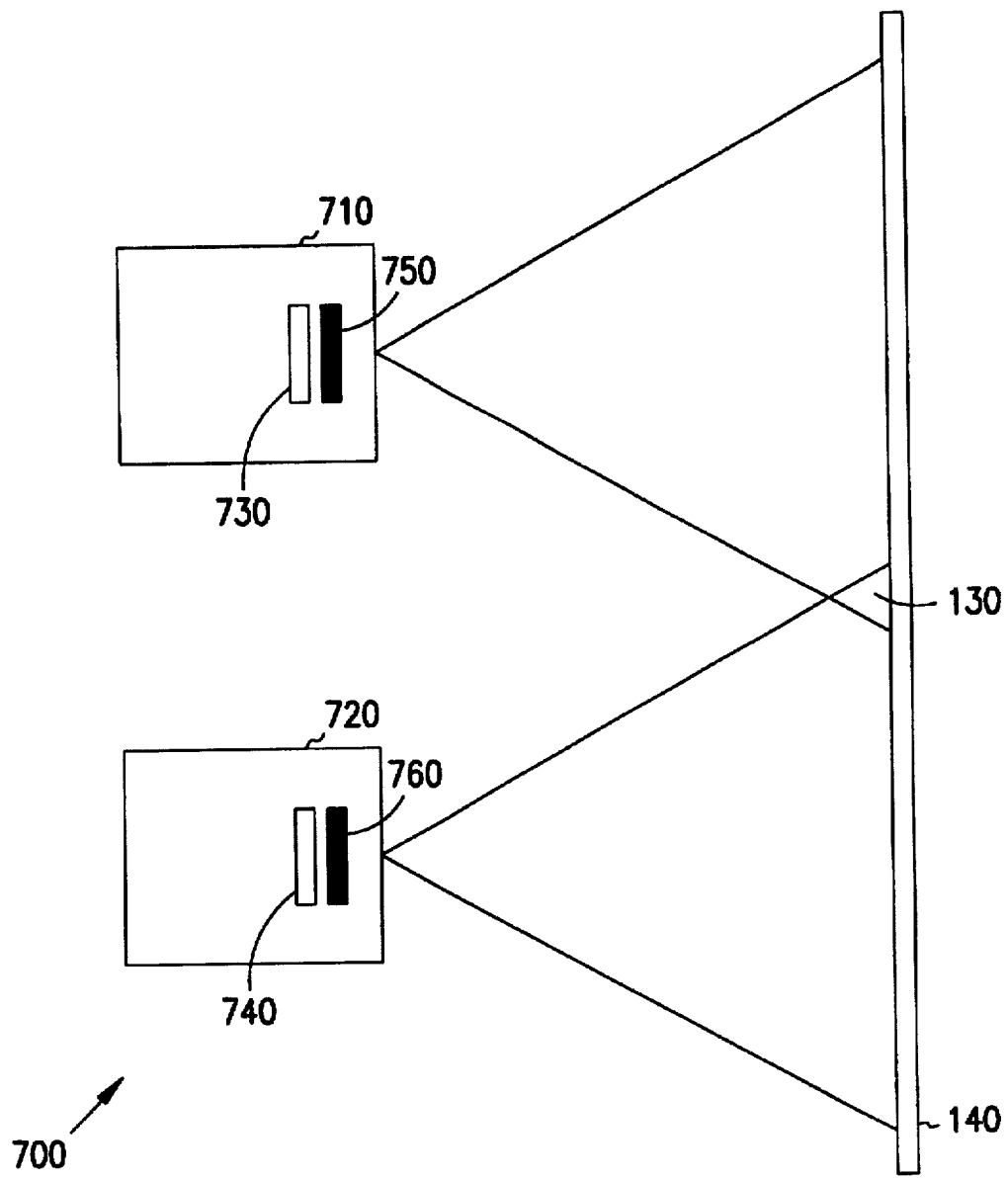
FIG. 7 is a schematic illustrating an example location of the present invention in a projector.

FIG. 7 is a schematic illustrating one embodiment employing the present invention in a display system 700 to produce a seamless tiled display image as illustrated in FIG. 6. The system includes the display screen 140, which can, for example, be a projection screen. The display system 700 further includes multiple displays 710 and 720 for displaying multiple discrete images separately onto the display screen 140 such that the multiple discrete images partially overlap with each other forming an overlapping region 130. The displays 710 and 720 can be projectors. The display system also includes spatial filters 750 and 760 disposed in each of the multiple displays to produce the seamless tiled display image illustrated in FIG. 6. The spatial filters 750 and 760 in each of the multiple displays 710 and 720 modulate light to produce the seamless tiled display image on to the display screen 140. The spatial filters 750 and 760 modulate the light based on a determined spatial gradient profile for each of the multiple displays 710 and 720. The spatial gradient profile for each of the spatial filters 750 and 760 is determined based on a measured luminance profile and a computed desired luminance profile for each of the displays, and may differ for each of the displays in a matrix. Then the determined spatial gradient profiles are applied to the spatial filters 750 and 760, respectively to modulate the light to produce the seamless tiled display image on to the display screen 140. The spatial filters 750 and 760 can be disposed anywhere in an image formation path of each of the displays. In one embodiment the spatial filters 750 and 760 are disposed between imaging devices 730 and 740 of the displays 710 and 720, respectively, and the display screen 140. The spatial filters 750 and 760 can be optical filters made of a transmissive medium. The transmissive medium can be a neutral density or monochrome filter, which acts uniformly regardless of hue of the light. The transmissive medium can also be a monochrome filter tuned for a specific color in the light. The transmissive medium can be an optical film. In one embodiment the spatial filters 750 and 760 modulate light to prevent a stray light coming into each of the imaging devices 730 and 740. The spatial filters 750 and 760 can also include holographic films for bending the light toward other spatial regions without a loss of a total light intensity in the projectors. When using a transmissive medium such as plastic, the polarization characteristics of the plastic can be used to benefit aligning the light with respect to a polarization direction of the displays.

In one embodiment, the luminance profile of each display is determined by obtaining an electronic image pattern using an electronic camera, normalizing the electronic camera performance, and removing the electronic camera distortion. The distortion can be a spatial distortion and/or a color distortion. The measured luminance profile can also be based on a projection distance, a digital image pattern of a set of iso-luminance images, an electronic camera to screen distance, and/or a screen curvature.

In another embodiment, the computed desired luminance profile is based on determining a minimum peak luminance occurring near the edge of each of the displays. In a further embodiment the computed desired luminance profile is based on selecting a reference luminance ($L_c$) from each of the displays for a center region of the seamless tiled display image, and computing a fall-off luminance profile for outside the center region for each of the displays. In a still further embodiment, the center region can be a summation of display centers of each of the displays.

Figure 8:
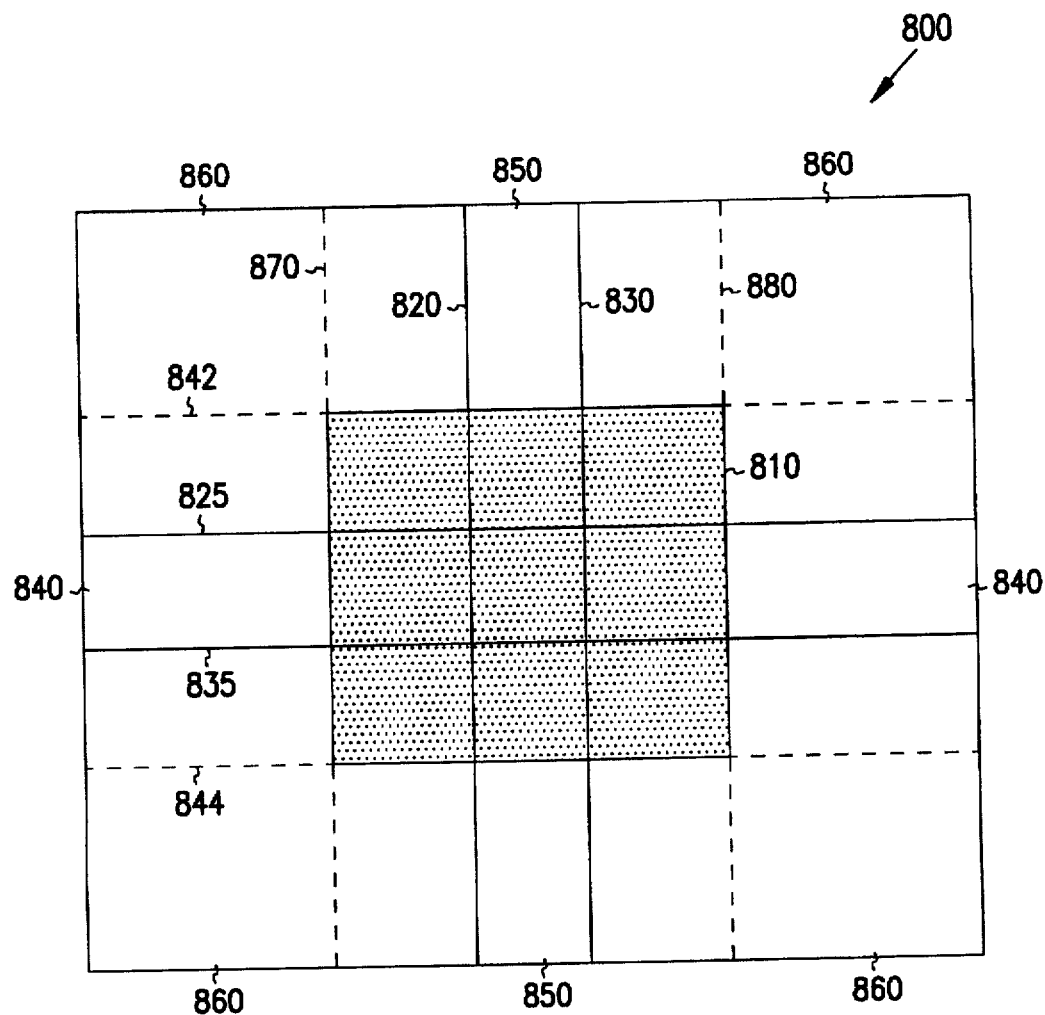
FIG. 8 illustrates an occurrence of a center region of overlap in a tiled 2×2 array of a tiled display.

FIG. 8 is a schematic illustration of an arrangement 800 of the luminance fall-off from the center region 810 to edges of a tiled display. FIG. 8 also shows a center region 810 of overlap for a 2×2 array of tiled displays. In computing the desired luminance profile, a minimum luminance $L_c$ is chosen for the center region 810, which usually occurs on the edges 820, 830, 825 and 835 of overlapping regions, and a fall-off profile is chosen for outside the center region 810. The fall-off profile outside the tile center region can be computed using a sinusoidal function based on the formula $$L(x,y) = L_c \left[ L_{x,min} + (1 - L_{x,min})\cos\left(\frac{\Delta x}{D_x}\pi\right) \right] \left[ L_{y,min} + (1 - L_{y,min})\cos\left(\frac{\Delta y}{D_y}\pi\right) \right]$$

where, $\Delta x$ ($\Delta y$) is a horizontal (vertical) distance to the left and right edges 870 and 880 (upper and lower edges 842 and 844) of the center region 810 (shaded area referred to in the figure) for left (right) fall off, $D_x$ ($D_y$) is a horizontal (vertical) dimension of each tiled image, and $L_{x,min}$ ($L_{y,min}$) is the desired minimum luminance of the fall-off horizontally (vertically). In the center region 810, both $\Delta x$ and $\Delta y$ are zero, resulting a desired uniform luminance $L_c$. In region 840 (850), $\Delta y$ ($\Delta x$) is zero; only one square bracketed term of the formula is applied. In region 860, both square brackets are applied because neither $\Delta x$ or $\Delta y$ is zero. The minimum luminance $L_{x,min}$ and $L_{y,min}$ is selected such that there is no luminance saturation anywhere in the region.

Described above is just one sinusoidal example of the function that can be used to compute the fall-off profile of a projector. Other mathematical profiles, such as gaussian or polynomial functions, can also be used.

In one embodiment, the spatial gradient profile is computed as:

Spatial gradient profile (x,y)=Desired luminance profile (x,y) [Operator] Measured luminance profile (x,y). The Operator can be a Division when the spatial filters 750 and 760 are disposed in close proximity to the imaging devices 730 and 740. In one embodiment, the spatial filters 750 and 760 shown in FIG. 7 is disposed next to the imaging devices 730 and 740, respectively. The Operator can alternatively be a convolution or an inverse convolution when the spatial filters 750 and 760 are disposed substantially away from the imaging devices 730 and 740. In this case, the spatial filters 750 and 760 are disposed outside the displays 710 and 720. The imaging device output can be modified by a LCD projector or a DMD projector. The imaging device can be a projection lens, located in the projectors.

Figure 9:
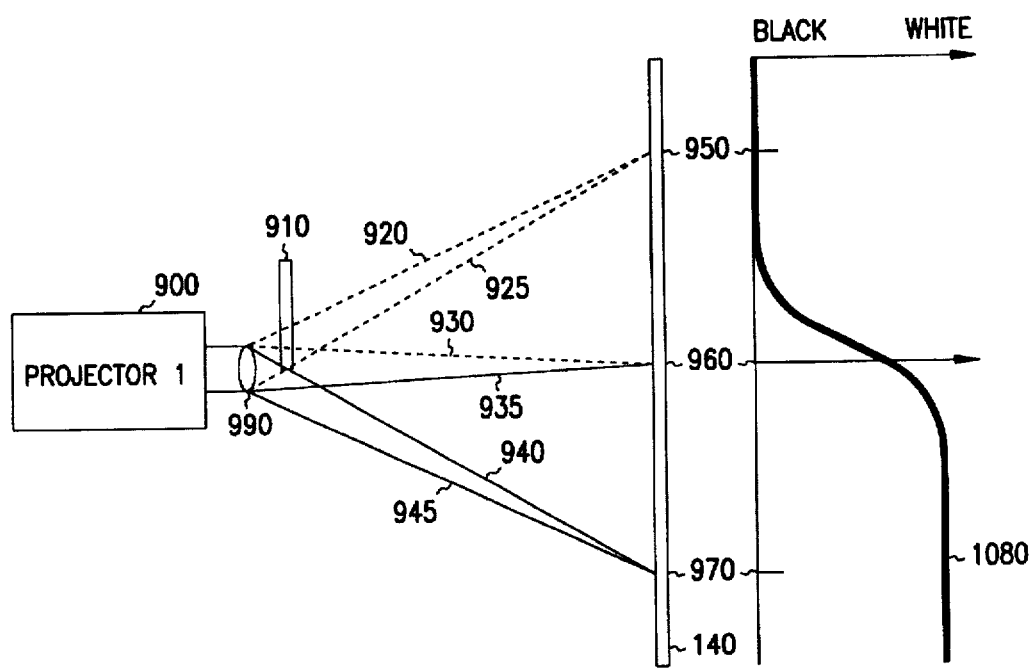
FIG. 9 illustrates a convolution of a spatial filter disposed between a projection lens and a display screen.

FIG. 9 is a schematic illustrating generally, one embodiment of spatial filter 910 disposed outside the projector— that is, between a projection lens 990 and a display screen 140). Curve 980 shows the resulting light distribution. The spatial filter 910 uses an aperture stop. The transmission of a gray region is the convolution of the aperture stop and the light distribution from conventional projection lens 990. For example, assume the projector 900 is commanded to provide a white image across the display screen 140 from points 950 to 970 and beyond. Point 950 is formed by rays 920, 925, and all the rays in between. But these are blocked by the aperture stop (which can be implemented as a spatial gradient and need not be opaque). Thus the image at 950 is black. Similarly, point 960 is formed by rays 930, 935 and all the rays in between. Ray 930 is blocked by the aperture stop and so contributes no light to 960. Ray 935 is not blocked. Thus, for rays between 930 and 935, point 960 is some shade of gray; its brightness is a function of the number of rays passed by the aperture stop and superposed at point 960. Point 970 on the display screen 140 is formed by rays 940, 945 and all the rays in between, which are not blocked by the aperture stop. Therefore point 970 is the brightest of the points examined here. FIG. 9 shows one form of the resultant pattern 980 from light to dark as a function of the display-screen position from points 950 to 970. Therefore, the summation of energy on the display screen 140 is a function of the position of the aperture stop relative to the projection lens 990 (the summation of energy can also be a function of projection lens 990, focal length, diameter, and of the object image size) as the rays converge on the display screen 140. These dependencies may be expressed in the form of a standard convolution integral or in the form of a numerical analysis expression, summing energies over areas and shapes of light blocked versus light passed. While this example illustrates a 2D framework, one skilled in the art can easily envision how it can be extended to real-world 3D implementations.

The spatial filters 750 and 760 shown in FIG. 7 can be incorporated into a light integrator in each of the projectors. The spatial filters 750 and 760 can also be incorporated into light pipes of each of the projectors, or into X-cubes for each of the projectors. Spatial filters 750 and 760 can also be incorporated into light sources of each of the projectors.

In one embodiment, the spatial gradient profile is computed using the relation:

Overflow spatial gradient profile (x,y)=Determined spatial gradient profile (x,y) [Times] A predetermined tolerance margin, where the determined gradient profile is computed using a mathematical function, and the predetermined tolerance margin provides a necessary correction in the desired luminance profile due to any alignment errors that can occur during a spatial filter insertion process. This predetermined tolerance margin always ensures more luminance than the determined luminance to correct for spatial filter insertion errors. The deviation from a desired luminance profile is eliminated by electronic calibration to obtain the desired luminance profile. The deviation from the desired luminance profile can be eliminated by adjusting the input video signal applied to each of the projectors.

Figure 10:
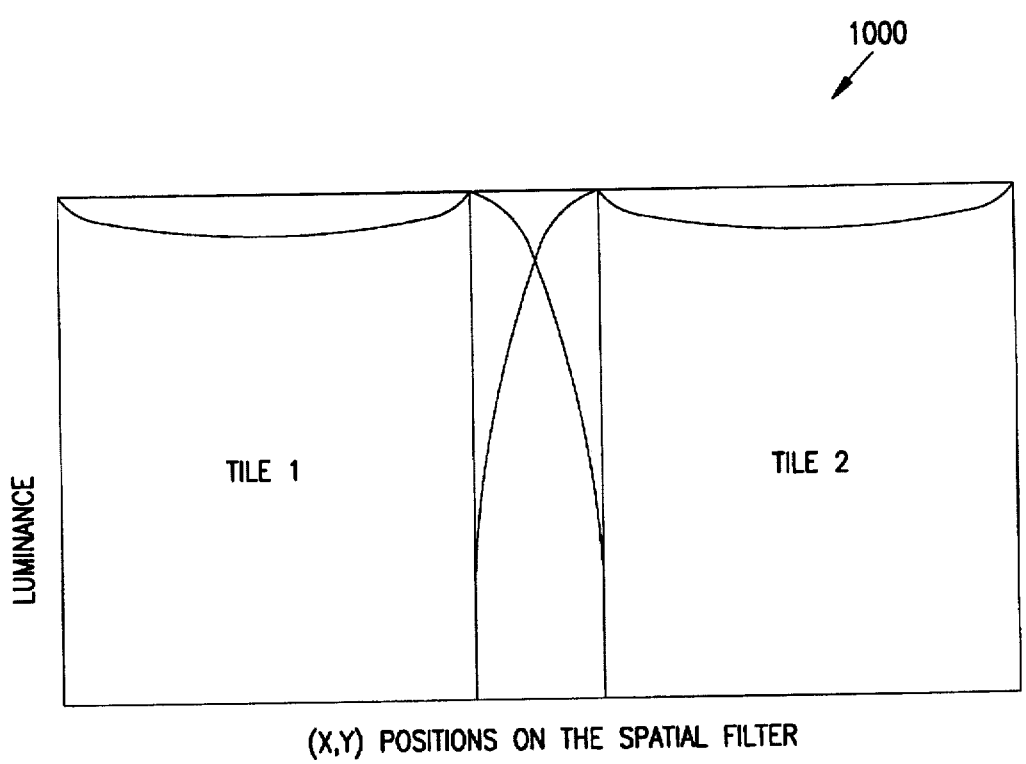
FIG. 10 illustrates transmission profile of spatial filters having spatial gradient profiles.

FIG. 10 is a schematic illustrating one example 1000 of transmission profiles of the spatial filters 750 and 760, and including the spatial gradient profiles between the imaging devices and a projection screen. The fall-off profiles of the spatial gradient profiles of these spatial filters 750 and 760 were computed by using the previously described sinusoidal functions.

Figure 11:
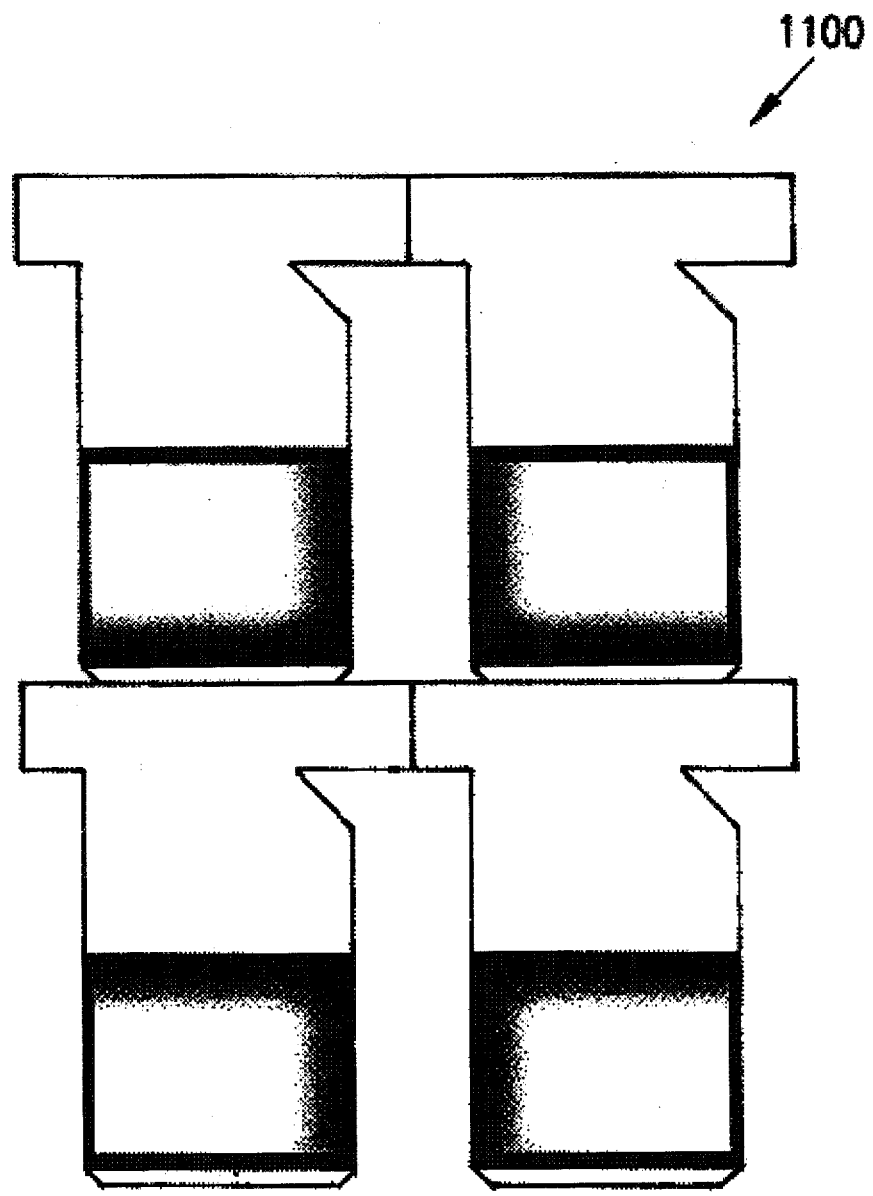
FIG. 11 shows optical filters having spatial gradient profiles used in a 2×2 array of projectors.

FIG. 11 illustrates one form of spatial filters 1100 having spatial gradient profiles, used in a two-by-two array of projectors to produce a seamless tiled display image on a projection screen. In this embodiment, the spatial filters were made by applying spatial gradient profiles to clear plastic films.

Figure 12:
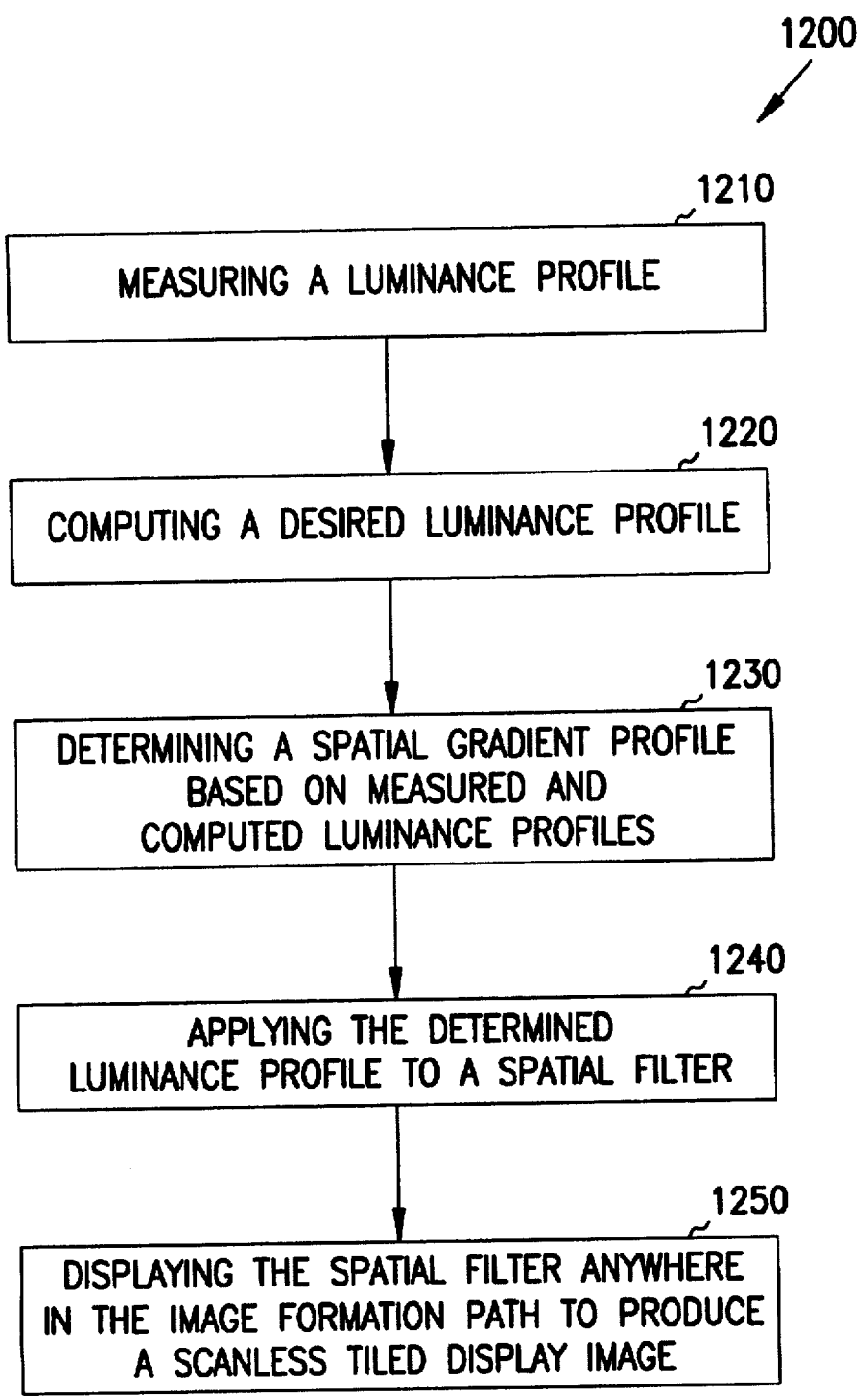
FIG. 12 is a flow diagram of the present invention.

FIG. 12 is a flow diagram illustrating generally one embodiment of a method 1200 of producing a seamless tiled display image from multiple overlapping discrete images. Method 1200 includes measuring a luminance profile for each of the multiple displays used in producing the seamless tiled display image 1210. In one embodiment, measuring the luminance profile further includes using an electronic camera to obtain an electronic image pattern for each of the multiple displays, and normalizing the electronic camera performance for each of the displays, and then removing the electronic camera inherent distortion for each of the displays to measure the luminance profile of each of the displays. Distortion can be a spatial distortion or color (luminance) distortion. In a further embodiment, luminance profile is measured and calibrated based on using any one or more of the parameters such as a projection distance, a digital image pattern of a set of iso-luminance images, an electronic camera to screen distance, a curvature of display screen, a distortion induced by the electronic camera including vignetting, and a distortion induced by the display screen. Measuring luminance profile can also include calibrating the electronic camera to have a linear response to color or luminance for each of the displays.

The next step 1220 in the process 1200 is to compute a desired luminance profile of each of the displays producing the seamless tiled display image. In one embodiment, the desired luminance profile is computed using a minimum peak luminance occurring near an edge of each of the displays as the desired luminance profile across a whole region of each of the multiple displays. In another embodiment, the luminance profile is computed by selecting a reference luminance from each of the displays for a center region of the seamless tiled display image, and computing a fall-off profile for outside the center region for each of the multiple displays using a mathematical function. The center region can be based on a summation of a display center of each of the displays. The mathematical function to compute the fall-off profile outside the center region can be based on functions such as a sinusoidal function, a gaussian function, a polynomial function, or a piecewise approximations.

The next step 1230 in the process 1200 is determining the spatial gradient profile of each of the multiple displays. In one embodiment, the spatial gradient profile is determined using the formula Spatial gradient profile (x,y)=Desired luminance profile (x,y) [Operator] Measured luminance profile (x,y).

The Operator is a division, when the spatial filter is disposed in close proximity to an imaging device of a projector. In this embodiment the spatial filter is disposed next to the imaging device. The Operator is a convolution or an inverse convolution, when the spatial filter is disposed substantially away from the imaging device of the projector. In this embodiment, the spatial filter is disposed outside the projector. Also in this embodiment, the output of the imaging device can be modulated by a projection lens. Imaging device can be a projection lens. In a further embodiment, the spatial gradient profile is computed by computing an overflow spatial gradient profile, and correcting for the overflow spatial gradient profile by an electronics calibration to obtain a desired spatial gradient profile. In an example embodiment, the overflow spatial gradient profile is determined using Overflow Spatial Gradient Profile (x,y)=Determined Spatial Gradient Profile (x,y) [Times] a Predetermined Tolerance Margin.

In a further embodiment the predetermined tolerance margin includes allowing a tolerance margin to provide more luminance than desired to correct for any alignment errors that might have occurred during a spatial filter insertion process. In this embodiment, the electronics calibration further includes adjusting an input video applied to the projector of each of the displays to obtain the desired spatial gradient profile.

The next step 1240 in the process 1200 is applying the desired spatial gradient profile to a spatial filter to be inserted into each of the multiple displays, to modulate a light to produce a seamless tiled display image from the multiple displays.

The next step 1250 in the process 1200 includes disposing the spatial filter anywhere in an image formation path of each of the multiple displays to produce the seamless tiled display image from the multiple displays. Image formation path can be between a light source of a display and a display screen. Disposing the spatial filter can include incorporating the spatial filter into a light pipe of each of the multiple displays to produce the seamless tiled display image. Disposing the spatial filter can also include incorporating the spatial filter into light integrators, X-cubes or light sources of projectors. Disposing the spatial filter can also include incorporating the spatial filter into a holographic film for bending the light toward other spatial regions without a loss of a total light intensity in each of the projectors. Spatial filter can be an optical filter. Optical filter can be a transmissive medium. In one embodiment the transmissive medium can be overlaid with a neutral density or monochrome filter or a monochrome filter tuned for a specific color in a light.

Conclusion

The above described system provides, among other things, a seamless tiled projection system that allows displays having a non-zero luminance black state to be tiled together to efficiently achieve a uniform black field, white field, and imagery in between.

The above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of producing a seamless tiled display image from multiple overlapping discrete images displayed by multiple displays, comprising:

measuring a luminance profile of each of the multiple displays used in producing the seamless tiled display image;

computing a desired luminance profile of each of the multiple displays producing the seamless tiled display image, wherein the desired luminance profile includes a fall-off luminance profile computed using a mathematical function for outside a center region of the seamless tiled display image for each display; and determining a spatial gradient profile of each of the multiple displays based on the measured luminance profile and the computed desired luminance profile of each of the multiple displays, respectively, to modulate a light to produce a seamless tiled display image from the multiple displays.

2. The method of claim 1, further includes applying the determined spatial gradient profile to a spatial filter to be applied to each of the multiple displays, respectively, to produce a seamless tiled display image from the multiple displays.

3. The method of claim 2, further includes disposing the spatial filter including the determined spatial gradient profile in an image formation path of each of the multiple displays.

4. The method of claim 3, wherein the image formation path is between light sources of the displays and a display screen.

5. The method of claim 4, wherein the displays are projectors.

6. The method of claim 4, wherein measuring the luminance profile further comprises:

using an electronic camera to obtain an electronic image pattern for each of the multiple displays;

normalizing the electronic camera performance for each of the multiple displays; and removing the electronic camera inherent distortion for each of the multiple displays to measure the luminance profile of each of the multiple displays.

7. The method of claim 6, wherein the distortion is a spatial distortion.

8. The method of claim 6, wherein the distortion is a color distortion.

9. The method of claim 6, wherein measuring the luminance profile of each of the multiple displays comprises measuring the luminance profile of each of the multiple displays based on parameters selected from the group consisting of projection distance, digital image pattern of a set of iso-luminance images, electronic camera to screen distance, curvature of display screen, distortion induced by the electronic camera, and distortion induced by the display screen.

10. The method of claim 6, further includes calibrating the electronic camera to have a linear response to color for each of the multiple displays.

11. The method of claim 6, further includes calibrating the electronic camera to have a linear response to a luminance for each of the multiple displays.

12. The method of claim 6, wherein computing the desired luminance profile comprises using a minimum peak luminance occurring near an edge of each of the multiple displays as the luminance across the whole region of each of the multiple displays for the desired luminance profile.

13. The method of claim 6, wherein determining the spatial gradient profile is determined from Spatial Gradient Profile (x,y)=Desired luminance profile (x,y) [Operator] Measured Luminance Profile (x,y).

14. The method of claim 13, wherein the Operator is a division when the spatial filter is disposed in close proximity to an imaging device of a projector.

15. The method of claim 14, wherein the spatial filter is disposed next to the imaging device.

16. The method of claim 14, wherein the Operator is a convolution when the spatial filter is disposed substantially away from the imaging device of the projector.

17. The method of claim 16, wherein the spatial filter is disposed outside the projector.

18. The method of claim 14, wherein an output of the imaging device is modulated using a projection lens.

19. The method of claim 6, wherein disposing the spatial filter comprises incorporating the spatial filter into light integrators of the projectors.

20. The method of claim 6, wherein disposing the spatial filter comprises incorporating the spatial filter into a light pipe of each of the projectors.

21. The method of claim 6, wherein disposing the spatial filter comprises incorporating the spatial filter into an X-cube of each of the projectors.

22. The method of claim 6, wherein disposing the spatial filter comprises incorporating the spatial filter into a light source of each of the projectors.

23. The method of claim 6, wherein the spatial filter is an optical filter.

24. The method of claim 23, wherein the optical filter is a transmissive medium.

25. The method of claim 24, wherein the transmissive medium is a neutral density filter which acts uniformly regardless of hue of the light.

26. The method of claim 6, wherein the spatial filter is incorporated onto a light valve of each of the projectors.

27. A method of producing a seamless tiled display image from multiple overlapping discrete images displayed by multiple displays, comprising:

using an electronic camera to obtain an electronic image pattern for each of the multiple displays;

normalizing the electronic camera performance for each of the multiple displays;

removing the electronic camera inherent distortion for each of the multiple displays to measure the luminance profile of each of the multiple displays;

computing a desired luminance profile by selecting a reference luminance ($L_c$) from each of the multiple displays for a center region of the seamless tiled display image, and computing a fall-off luminance profile for outside the center region for each of the multiple displays using a mathematical function;

determining a spatial gradient profile of each of the multiple displays based on the measured luminance profile and the computed desired luminance profile of each of the multiple displays, respectively, to modulate a light to produce a seamless tiled display image from the multiple displays;

applying the desired spatial gradient profile to a spatial filter to be applied to each of the multiple displays, respectively, to produce a seamless tiled display image from the multiple displays; and disposing the spatial filter including the determined spatial gradient profile in an image formation path of each of the multiple displays to produce the seamless tiled display image from the multiple displays.

28. The method of claim 27, where the center region comprises a summation of light energy at a display center of each of the multiple displays.

29. The method of claim 27, wherein the mathematical function is based on selecting from the group consisting of sinusoidal function, gaussian function, polynomial function, and piecewise approximations.

30. The method of claim 27, wherein the fall-off profile outside the center region is determined from $$L(x, y) = L_c \left[ L_{x,min} + (1 - L_{x,min}) \cos\left(\frac{\Delta x}{D_x}\pi\right) \right] \left[ L_{y,min} + (1 - L_{y,min}) \cos\left(\frac{\Delta y}{D_y}\pi\right) \right],$$

where $\Delta x$ is a horizontal distance to a left or right edge of the center region for left fall off, $D_x$ is a horizontal dimension of each tiled image, and $L_{x,min}$ is a desired minimum luminance of a fall-off horizontally, and where $\Delta y$ is a vertical distance to a right or left edge of the center region for right fall off, $D_y$ is a vertical dimension of each of the tiled image, and $L_{y,min}$ is a desired minimum luminance of a fall-off vertically.

31. A method of producing a seamless tiled display image from multiple overlapping discrete images displayed by multiple displays, comprising:

using an electronic camera to obtain an electronic image pattern for each of the multiple displays;

normalizing the electronic camera performance for each of the multiple displays;

removing the electronic camera inherent distortion for each of the multiple displays to measure the luminance profile of each of the multiple displays;

computing a desired luminance profile of each of the multiple displays producing the seamless tiled display image;

determining a spatial gradient profile of each of the multiple displays based on the measured luminance profile and the computed desired luminance profile of each of the multiple displays, respectively, to modulate a light to produce a seamless tiled display image from the multiple displays, wherein the spatial gradient profile is determined using the equation Spatial Gradient Profile (x,y)=Desired luminance profile (x,y) [Operator] Measured Luminance Profile (x,y);

computing an overflow spatial gradient profile based on

Overflow Spatial Gradient Profile (x,y)=Determined Spatial Gradient Profile (x,y) [Times] a Predetermined Tolerance Margin;

correcting the overflow spatial gradient profile by an electronics calibration to obtain a desired spatial gradient profile;

applying the desired spatial gradient profile to a spatial filter to be applied to each of the multiple displays, respectively, to produce a seamless tiled display image from the multiple displays; and disposing the spatial filter including the determined spatial gradient profile in an image formation path of each of the multiple displays to produce the seamless tiled display image from the multiple displays.

32. The method of claim 31, further including applying the desired spatial gradient profile to a spatial filter to be inserted into each of the multiple displays, to produce a seamless tiled display image from the multiple displays.

33. The method of claim 31, wherein determining the predetermined tolerance margin comprises allowing a tolerance margin to provide more luminance than desired to correct for alignment errors that can be incurred during a spatial filter insertion process.

34. The method of claim 31, wherein the electronics calibration comprises adjusting an input video applied to the projector of each of the multiple displays to obtain the desired spatial gradient profile.

35. A method of producing a seamless tiled display image from multiple overlapping discrete images displayed by multiple displays, comprising using an electronic camera to obtain an electronic image pattern for each of the multiple displays;

normalizing the electronic camera performance for each of the multiple displays; removing the electronic camera inherent distortion for each of the multiple displays to measure the luminance profile of each of the multiple displays;

computing a desired luminance profile of each of the multiple displays producing the seamless tiled display image;

determining a spatial gradient profile of each of the multiple displays based on the measured luminance profile and the computed desired luminance profile of each of the multiple displays, respectively, to modulate a light to produce a seamless tiled display image from the multiple displays;

applying the determined spatial gradient profile to a spatial filter to be applied to each of the multiple displays, respectively, to produce a seamless tiled display image from the multiple displays; and disposing the spatial filter including the determined spatial gradient profile in an image formation path of each of the multiple displays to produce the seamless tiled display image from the multiple displays, wherein disposing the spatial filter comprises incorporating the spatial filter into a holographic film for bending the light toward other spatial regions without a loss of a total light intensity in each of the projectors.

36. A method of producing a seamless tiled display image from multiple overlapping discrete images displayed by multiple displays, comprising:

using an electronic camera to obtain an electronic image pattern for each of the multiple displays;

normalizing the electronic camera performance for each of the multiple displays;

removing the electronic camera inherent distortion for each of the multiple displays to measure the luminance profile of each of the multiple displays;

computing a desired luminance profile of each of the multiple displays producing the seamless tiled display image;

determining a spatial gradient profile of each of the multiple displays based on the measured luminance profile and the computed desired luminance profile of each of the multiple displays, respectively, to modulate a light to produce a seamless tiled display image from the multiple displays;

applying the determined spatial gradient profile to a spatial filter to be applied to each of the multiple displays, respectively, to produce a seamless tiled display image from the multiple displays, wherein the spatial filter is a transmissive medium, wherein the transmissive medium is a monochrome filter tuned for a specific color in the light; and disposing the spatial filter including the determined spatial gradient profile in an image formation path of each of the multiple displays to produce the seamless tiled display image from the multiple displays.

37. A display system for producing a seamless tiled display image from multiple discrete images, comprising:

multiple displays for displaying each of the multiple discrete images separately onto the display screen, the multiple displays displaying the multiple discrete images such that at least one of the multiple discrete images partially overlaps with another of the at least one multiple discrete images; and a spatial filter, disposed in each of the multiple displays, to produce the seamless tiled display image from the multiple overlapping discrete images, wherein the spatial filter modulates a light based on a determined spatial gradient profile of each of the multiple displays, wherein the determined spatial gradient profile is based on a measured luminance profile of each of the multiple displays and a computed desired luminance profile for each of the multiple displays, respectively, wherein the desired color profile includes a fall-off luminance profile, computed using a mathematical function, for outside a center region of the seamless tiled display image for each display.

38. The display system of claim 37, wherein the display system receives multiple discrete video signals that is used to generate the multiple discrete images.

39. The display system of claim 37, wherein the spatial filter is disposed in an image formation path of each of the multiple displays.

40. The display system of claim 37, further includes a display screen.

41. The display system of claim 40, wherein the display screen is a projection screen.

42. The display system of claim 37, wherein the multiple displays are multiple projectors.

43. The display system of claim 42, wherein the spatial filter is disposed between an imaging device of each of the multiple projectors and the projection screen.

44. The display system of claim 37, wherein the spatial filter is an optical filter.

45. The display system of claim 44, wherein the optical filter is a transmissive medium.

46. The display system of claim 45, wherein the transmissive medium is a neutral density filter which acts uniformly regardless of hue of the light.

47. The display system of claim 45, wherein the transmissive medium is an optical film.

48. The display system of claim 37, wherein the measured luminance profile is determined by obtaining an electronic image pattern using an electronic camera and normalizing the electronic camera performance and removing the electronic camera distortion to measure the luminance profile of each of the multiple displays.

49. The display system of claim 48, wherein the distortion is a spatial distortion.

50. The display system of claim 48, wherein the distortion is a color distortion.

51. The display system of claim 48, wherein the measured luminance profile of each of the multiple displays is computed based on selecting from the group consisting of a projection distance, a digital image pattern of a set of iso-luminance images, an electronic camera to screen distance, and a screen curvature.

52. The display system of claim 37, wherein the computed desired luminance profile comprises using a minimum peak luminance occurring near an edge of each of the multiple displays as the luminance across a whole region of each of the multiple displays for the desired luminance profile.

53. The display system of claim 37, wherein the determined spatial gradient profile is based on Spatial Gradient Profile (x,y)=Desired luminance profile (x,y) [Operator] Measured Luminance Profile (x,y).

54. The display system of claim 53, wherein the Operator is a division when the spatial filter is disposed in close proximity to an imaging device of a projector.

55. The display system of claim 54, wherein the spatial filter is disposed next to the imaging device.

56. The display system of claim 53, wherein the Operator is a convolution when the spatial filter is disposed substantially away from the imaging device of a projector.

57. The display system of claim 56, wherein the spatial filter is disposed outside the projector.

58. The display system of claim 53, wherein the imaging device is a projection lens.

59. The display system in claim 37, wherein the spatial filter comprises incorporating the spatial filter into a light integrator of each of the projectors.

60. A method of producing a seamless tiled display image from multiple overlapping discrete images displayed by multiple displays, comprising:
    using an electronic camera to obtain an electronic image pattern for each of the multiple displays;
    normalizing the electronic camera performance for each of the multiple displays;
    removing the electronic camera inherent distortion for each of the multiple displays to measure the luminance profile of each of the multiple displays;
    computing a desired luminance profile of each of the multiple displays producing the seamless tiled display image;
    determining a spatial gradient profile of each of the multiple displays based on the measured luminance profile and the computed desired luminance profile of each of the multiple displays, respectively, to modulate a light to produce a seamless tiled display image from the multiple displays;
    applying the determined spatial gradient profile to a spatial filter to be applied to each of the multiple displays, respectively, to produce a seamless tiled display image from the multiple displays, wherein the spatial filter is an electronic shutter having a spatial gray shade capability; and
    disposing the spatial filter including the determined spatial gradient profile in an image formation path of each of the multiple displays to produce the seamless tiled display image from the multiple displays.

61. The method of claim 60, wherein the spatial filter is a modulator of light.

62. The method of claim 61, wherein the modulation of light is based on selecting from the group consisting of transmitting, reflecting, refracting, and polarization.

63. A method of producing a seamless tiled display image from multiple displays, comprising:
    measuring a color profile of each of the multiple displays used in producing the seamless tiled display image;
    computing a desired color profile for each of the multiple displays producing the seamless tiled display image, wherein the desired color profile includes a fall-off luminance profile, computed using a mathematical function, for outside a center region of the seamless tiled display image for each display; and
    determining a spatial gradient profile of each of the multiple displays based on the measured color profile and the computed desired color profile of the each of the multiple displays, respectively, to produce a seamless tiled display image from the multiple displays.

64. The method of claim 63, further includes applying the determined spatial gradient profile to a spatial filter to be inserted into each of the multiple displays, respectively, to produce a seamless tiled display image from the multiple displays.

65. The method of claim 64, further includes disposing the spatial filter anywhere in an image formation path of each of the multiple displays.

66. A display system for producing a seamless tiled display image from multiple discrete images, comprising:
    multiple displays for displaying each of the multiple discrete images separately onto the display screen, the multiple displays displaying the multiple discrete images such that at least one of the multiple discrete images partially overlaps with another of the at least one multiple discrete images; and
    a spatial filter, disposed in each of the multiple displays, to produce the seamless tiled display image from the multiple overlapping discrete images, wherein the spatial filter modulates a light based on a determined spatial gradient profile of each of the multiple displays, wherein the determined spatial gradient profile is based on a measured luminance profile of each of the multiple displays and a computed desired luminance profile for each of the multiple displays, respectively, wherein the spatial filter is a transmissive medium, wherein the transmissive medium is a monochrome filter tuned for a specific color in the light.

67. A display system for producing a seamless tiled display image from multiple discrete images, comprising:
    multiple displays for displaying each of the multiple discrete images separately onto the display screen, the multiple displays displaying the multiple discrete images such that at least one of the multiple discrete images partially overlaps with another of the at least one multiple discrete images; and
    a spatial filter, disposed in each of the multiple displays, to produce the seamless tiled display image from the multiple overlapping discrete images, wherein the spatial filter modulates a light based on a determined spatial gradient profile of each of the multiple displays, wherein the determined spatial gradient profile is based on a measured luminance profile of each of the multiple displays and a computed desired luminance profile for each of the multiple displays, respectively, wherein the spatial filter modulates the light to prevent stray light from coming from each of the projectors.

68. A display system for producing a seamless tiled display image from multiple discrete images, comprising:
    multiple displays for displaying each of the multiple discrete images separately onto the display screen, the multiple displays displaying the multiple discrete images such that at least one of the multiple discrete images partially overlaps with another of the at least one multiple discrete images; and
    a spatial filter, disposed in each of the multiple displays, to produce the seamless tiled display image from the multiple overlapping discrete images, wherein the spatial filter modulates a light based on a determined spatial gradient profile of each of the multiple displays, wherein the determined spatial gradient profile is based on a measured luminance profile of each of the multiple displays and a computed desired luminance profile for each of the multiple displays, respectively, and wherein the computed desired luminance comprises selecting a reference luminance from each of the multiple displays for a center region of the seamless tiled display image, and computing a fall-off luminance profile for outside the center region for each of the multiple displays using a mathematical function.

69. The display system of claim 68, wherein the center region comprises a summation of light energy at display centers of each of the multiple displays.

70. The display system of claim 68, wherein computing the fall-off profile outside the center region is based on a mathematical function.

71. The display system of claim 68, wherein the mathematical function is selected from the group consisting of a sinusoidal function, a gaussian function, and a polynomial function.

72. The display system of claim 68, wherein the computing the fall-off profile outside the center region is determined by $$L(x,y) = L_c \left[ L_{x,min} + (1 - L_{x,min})\cos\left(\frac{\Delta x}{D_x}\pi\right) \right] \left[ L_{y,min} + (1 - L_{y,min})\cos\left(\frac{\Delta y}{D_y}\pi\right) \right].$$

where, $\Delta x$ is a horizontal distance to a left or right edge of the center region for left fall off, $D_x$ is a horizontal dimension of each tiled image, and $L_{x,min}$ is a desired minimum luminance of the fall-off horizontally, and where $\Delta y$ is a vertical distance to a right or left edge of the center region for right fall off, $D_y$ is a vertical dimension of each of the tiled image, and $L_{y,min}$ is a desired minimum luminance of the fall-off vertically.

* * * * *